United States Patent Office 3,360,565
Patented Dec. 26, 1967

3,360,565
METHOD OF PRODUCING 2,2,6,6-TETRA-CHLOROCYCLOHEXANONE
Hans Arnoldy, Van Houtenlaan, Weesp, Netherlands, assignor to North American Philips Company Inc., New York, N.Y., a corporation of Delaware
No Drawing. Filed Aug. 10, 1965, Ser. No. 478,767
Claims priority, application Netherlands, Aug. 12, 1964, 64—9,256
7 Claims. (Cl. 260—586)

ABSTRACT OF THE DISCLOSURE

Cyclohexanol is chlorinated in the presence of a hydrocarbylamine to produce 2,2,6,6-tetrachlorocyclohexanone.

The invention relates to a method of producing 2,2,6,6-tetrachlorocyclohexanone.

The 2,2,6,6-tetrachlorocyclohexanone is a known compound, the usefulness of which as a starting material for the production of 2,6-dichlorobenzonitrile, a known herbicide, is described in Belgian Patent 647,497.

It is known that 2,2,6,6-tetrachlorocyclohexanone can be produced by reacting cyclohexanol with chlorine. German patent specification 823,449, published in 1951, describes that the reaction is performed with a yield of 60%, when cyclohexanol is treated with chlorine while being exposed to ultraviolet light and as the case may be in the presence of a catalyst, which may be formed by organic peroxides. R. Riemschneider in Monatsheft für Chemie, 85, vol. 2, 417 (1954), obtains a yield of 55% by slowly introducing chlorine into cyclohexanol at 5° C. to 10° C. and a yield of 25% when chlorine is rapidly introduced.

The applicant has now found that the reaction can be performed with a considerably higher yield by chlorinating cyclohexanol in the presence of a hydrocarbylamine, a salt of such an amine or ethanolamine. Yields of more than 90% can be obtained.

In accordance therewith the invention relates to a method of producing 2,2,6,6-tetrachlorocyclohexanone and is characterized in that cyclohexanol is reacted in the presence of an amine or a salt of an amine with chlorine.

The reaction may be carried out by introducing chlorine, if desired while stirring, into cyclohexanol, which may be diluted with solvents, in the presence of an amine or a salt thereof.

Suitable solvents are, for example, water and chlorinated hydrocarbons, e.g., carbon tetrachloride, tetrachloroethane, dichloromethane, dichloroethane or mixtures thereof.

A great variety of amines, salts thereof and mixtures thereof is suitable. Both aliphatic and aromatic amines and also heterocyclic amines may be employed. Suitable aliphatic amines are, for example, trimethylamine, diethylamine, propylamine, allylamine, ethylendiamine, and ethanolamine and aromatic amines are, for example, aniline, dimethylaniline, toluidines, phenylene diamines and heterocyclic amines are, for example, collidines, pyridine, quinoline, lutidines, picolines and pyrazine.

Use is preferably made of heterocyclic amines and their salts.

Although amines of highly different basicity may be used, the best results are obtained with the more basic amines.

The reaction is therefore preferably carried out in the presence of a collidine or a quinoline and particularly in the presence of a collidine.

Salts in the presence of which the reaction is performed with satisfactory yields are compounds of, for example, the said amines, with inorganic or organic acids, for example, acetic acid, butyric acid and, for example, with a hydrohalide, e.g., hydrochloric acid.

The ketone may be produced in the presence of more than 0.5% by weight of an amine or salt thereof, calculated on cyclohexanol, and particularly 1 to 100% by weight and especially with 3 to 15% by weight satisfactory results are obtained.

The chlorination may be performed at 0° C. to 100° C., but preferably the temperature is chosen between 50° C. and 90° C. The reaction is preferably carried out with an equivalent quantity of chlorine or with a small excess quantity of 10%.

Example 1

At 65° C. to 80° C. 1065 g. of chlorine was introduced into a mixture of 300 g. of cyclohexanol, 25 ml. of water, 240 ml. of carbon tetrachloride and 30 g. of collidine. After the carbontetrachloride had been distilled off, the crude reaction product was dissolved in 1500 ml. of petroleum-ether (60–80) and washed three times at 55° C. with 150 ml. of water. The solution was cooled to −10° C. and the precipitate was filtered off. Yield 639 g. (=90.2%). Melting point 82–83° C.

Example 2

At 60° C. to 90° C. 1065 g. of gaseous chlorine was introduced, while stirring vigorously, into a mixture of 300 g. of cyclohexanol, 20 ml. of water, 180 ml. of tetrachloroethane and 20 g. of diethylaniline. After the solvent had been distilled off, the crude reaction product was dissolved in 1800 ml. of petroleum-ether (60–80) and at 55° C. to 60° C. it was washed with 1 N HCl. After the solution had been cooled to −10° C., the precipitate was filtered off and dried. Yield 600 (=84.7%). Melting point 82–84° C.

Example 3

At 70° C. to 80° C. 1170 g. of gaseous chlorine was introduced, while vigorously stirring into a mixture of 300 g. of cyclohexanol, 25 ml. of water, 180 ml. of carbontetrachloride, 25 g. of t-butylamine. The crude reaction produced was washed at 70° C. to 75° C. three times with 1 N HCl, after which the solvent was distilled off. 1500 ml. of petroleum-ether (60–80) was added to the residue and the mixture was cooled to −10° C. Yield 627 g. (=88.5%). Melting point 82–83° C.

Example 4

The method described in Example 1 was repeated, but instead of 30 g. of collidine, 43 g. of collidine HCl was used. Yield 90.2%. Melting point 82–83° C.

What is claimed is:
1. A method of producing 2,2,6,6-tetrachlorocyclohexanone comprising reacting a mixture of cyclohexanol and a quantity of chlorine ranging from about an equivalent amount to about a 10% excess of the chlorine at a temperature of 0° C. to 100° C. in the presence of about 1%–100%, based on the weight of the cyclo- hexanol, of an amine selected from the group consisting of aromatic, aliphatic and heterocyclic hydrocarbylamines and ethanolamine.

2. The method of claim 1 wherein the reaction is carried out in a solvent.

3. The method of claim 1 wherein a heterocyclic amine is employed.

4. The method of claim 1 wherein an aromatic amine is employed.

5. The method of claim 3 wherein collidine is employed.

6. The method of claim 1 wherein a hydrohalide acid salt of an amine is employed.

7. The method of claim 6 wherein a hydrochloric acid salt of an amine is employed.

References Cited

UNITED STATES PATENTS 2,674,572   4/1954   Gundel et al. _____ 260—586

LEON ZITVER, *Primary Examiner.*

M. JACOB, *Assistant Examiner.*